United States Patent [19]

Vigliante

[11] 3,774,166

[45] Nov. 20, 1973

[54] SHORT-RANGE DATA PROCESSING TRANSFERS

[76] Inventor: Frank S. Vigliante, Piscataway Township, Middlesex County, N.J.

[22] Filed: Sept. 30, 1963

[21] Appl. No.: 312,442

[52] U.S. Cl. .............................................. 340/172.5

[51] Int. Cl. ............................................... G11c 7/00

[58] Field of Search .................. 340/172.5; 235/157

[56] References Cited

UNITED STATES PATENTS

| | | | |
|---|---|---|---|
| 3,239,816 | 3/1966 | Breslin et al. | 340/172.5 |
| 3,319,226 | 5/1967 | Mott et al. | 340/172.5 |
| 3,297,997 | 1/1967 | Grady et al. | 340/172.5 |
| 3,292,155 | 12/1966 | Neilson | 340/172.5 |
| 3,290,655 | 12/1966 | Abernathy | 340/172.5 |
| 3,275,989 | 9/1966 | Glaser et al. | 340/172.5 |
| 3,249,920 | 5/1966 | Pulver, Jr. | 340/172.5 |
| 3,222,649 | 12/1965 | King et al. | 340/172.5 |
| 3,067,406 | 12/1962 | Southard | 340/172.5 |
| 3,059,222 | 10/1962 | Demmer | 340/172.5 |
| 3,058,659 | 10/1962 | Demmer et al. | 235/176 |
| 3,036,773 | 5/1962 | Brown | 235/157 |
| 2,916,210 | 12/1959 | Selmer | 235/157 |
| R25,120 | 2/1962 | Holmes | 235/157 |

OTHER PUBLICATIONS

"Digital Computer Design Fundamentals" Y. Chie 10/1962, McGraw-Hill pgs- 457-459

*Primary Examiner*—Gareth D. Shaw
*Attorney*—R. B. Ardis and William L Keefauver

[57] ABSTRACT

A method of, and apparatus for, transferring control of a data processor to an instruction in nonsequential memory location is disclosed. The transfer instruction has an operand that is only a fraction of the length of a full memory address. When the instruction is executed, its fractional length operand is gated into the program address register replacing an equivalent portion of the contents of that register.

13 Claims, 1 Drawing Figure

PATENTED NOV 20 1973 3,774,166
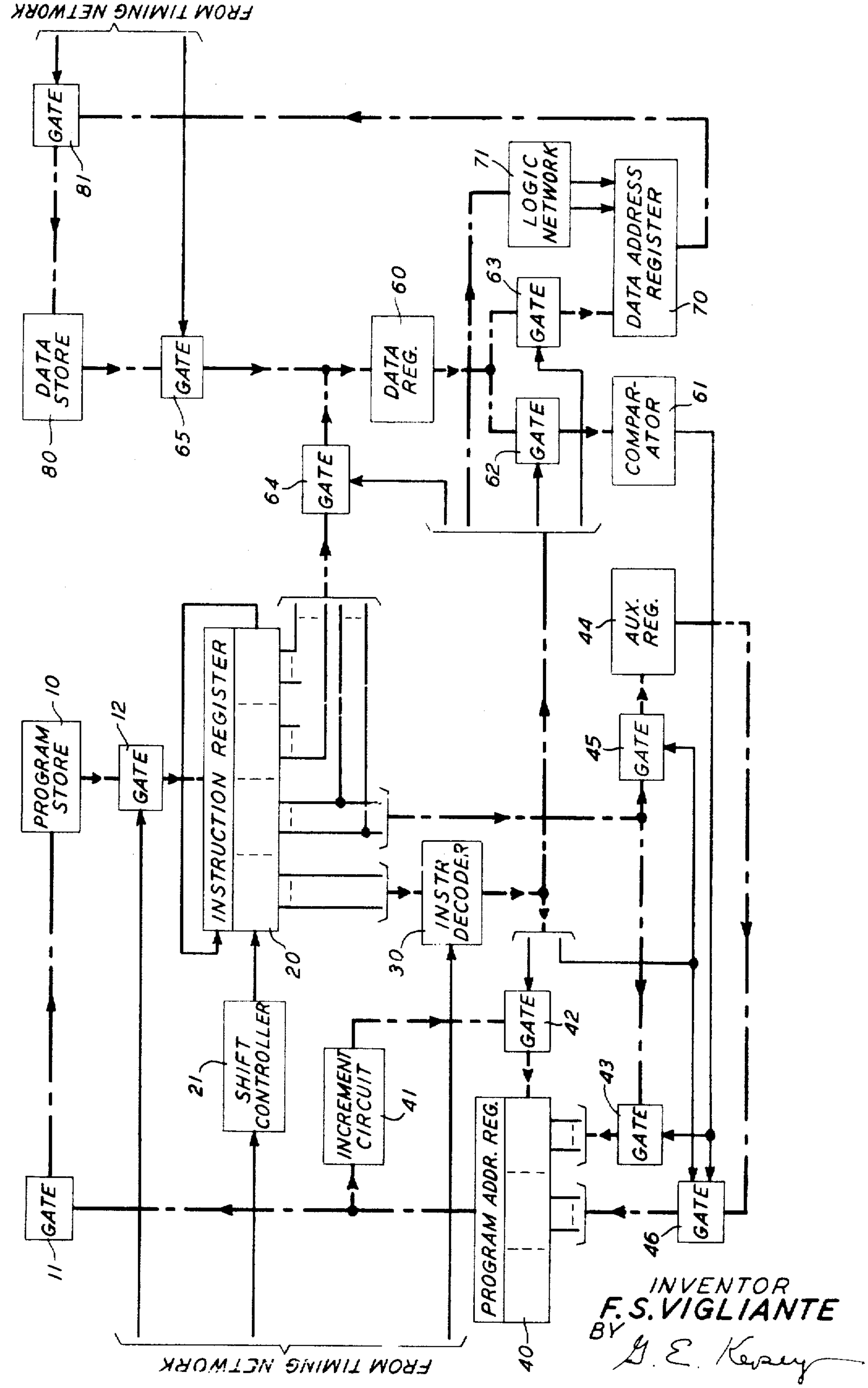
INVENTOR
F. S. VIGLIANTE
BY G. E. Kersey
ATTORNEY

SHORT-RANGE DATA PROCESSING TRANSFERS

This invention relates to programmed data processing and more particularly to the facilitation of program transfers during the course of processing.

A program is a set of instructions by which data are manipulated in a preassigned fashion. During processing, the data are variously entered into and extracted from storage.

Associated with the instructions are addresses giving their locations in storage. These addresses must be sufficiently extensive to provide access to any of the storage locations devoted to the instructions. In a large scale machine this means that each address must include a large number of digits.

The addresses are ordinarily assigned sequentially to the steps of the program. But this does not mean that the instructions are executed in a fixed sequence. Some operations are contingent upon the presence of particular data. Others take place recurrently and are represented by a single set of entries to save storage space. Hence a program proceeds sequentially until a condition is encountered which dictates a transfer to some nonsequential storage location.

The transfer is accomplished by an address which is of the same extent, i.e., length, as that used for ordinary addressing. In a large scale machine this requires the storage of transfer instructions having an appreciable word length. Besides reducing storage capability, such instructions increase the complexity of the numerical manipulation required where indirect addressing is employed.

Accordingly it is an object of the invention to accomplish transfers with abbreviated instructions. A related object is to reduce the word length of transfer instructions and thus increase the storage capability of a data procesisng system. A further object is to facilitate the detection of transfer errors.

According to the invention a transfer is accomplished with an abbreviated address by displacing selected portions of a pre-existing address being used to extract instructions from storage. Because the transfer instruction is abbreviated, it may be included at the same storage location with one or more additional instructions. In addition, since the range of the resulting transfer is limited, errors giving rise to a transfer beyond the range are readily detected.

In the case of a data processing system where stored instructions are executed under the control of an address register, the latter is divided into sections whose contents are supplanted according to the transfer operation being undertaken.

Where it is desired to increase the range of the transfer beyond that permitted by a single abbreviated address, the displacing information is accumulated over several cycles of operation prior to execution. For this aspect of the invention each accumulation is associated with a distinctive section of the address register.

Other aspects of the invention will become apparent after considering an illustrative embodiment taken in conjunction with the FIGURE which is a block diagram of a data processing system.

As shown in the FIGURE, a program store 10, operating through an instruction register 20 and an instruction decoder 30, serves as a source of instructions for controlling a data register 60 that acts in conjunction with a data address register 70 and a data store 80. For simplicity the program store is separate from the data store, but the same unit, for example a magnetic core matrix of conventional construction, may be used for both. In addition, the various gates and other components of the figure are of standard design.

Before an instruction can be executed, it is extracted from storage by a program address register 40 whose coded output gives the location of the instruction in the program store. After parallel code signals forming the address are sent through a gate 11, the contents of the program store at the designated address enter the instruction register through another gate 12. Both gates are enabled from a timing network (not shown). They, as well as the timing network, are of conventional construction.

Each instruction entering the register has at least two portions — one of which is a command, the other of which is an operand. The operand is frequently either a data item or a transfer address, but it includes any item dispatched according to the command. Frequently several instructions enter the register simultaneously. In that event, the one in the left-hand section of the register is executed first, after which a shift control network 21, operating from the timing network, enters the contents of the right-hand section into the left-hand section for execution.

Each distinctive command is translated by the decoder 30 to energize a distinctive output terminal of the latter. Generally, the decoder output serves to enable various gates and other components.

Where the steps of the program are to be taken in sequence, each succeeding address at the output of the program address register 40 is obtained by augmenting its predecessor by unity through the action of a standard increment circuit 41 and an increment circuit gate 42. However, when a transfer is to be made in accordance with the invention, the address indicated by the program address register is modified in a way dictated by the operand portion of the instruction commanding the transfer. This modification is achieved by having the command portion of the transfer instruction initiate the operation of a data comparator 61 in order to activate a gate 43. The latter allows the operand portion of the instruction to enter the program address register 40 and supplant the information formerly contained in its right-hand section. Consequently the address indicated at the output of the program address register is of the proper length for addressing the program store, but it has been modified to accord with the new location from which a succeeding instruction is to be obtained. This is accomplished without either the need for numerical modification of a stored address or without resort to a transfer address of the same length as that required for program store addressing. Where desirable, the operand portion of the transfer instruction may be mathematically combined with the pre-existing program address to establish the desired program store location.

Where the displacement of a portion of the preexisting program address will not suffice to provide the range required by a particular transfer operation, a partial displacement for the program address register is accumulated in an auxiliary register 44 during an earlier operating cycle. At that time a decoder signal enabled an input gate 45 of the register 44 and set an output gate 46. Subsequently the comparator signal completes the enablement of the output gate 46 and resets it after a delay interval that is sufficient to allow entry of the accumulation into the middle section of the program address register 40.

The accompanying operations in the data portion of the system and the effects upon components 62 through 65, 71 and 81, are determined by the particular data manipulations being undertaken.

A representative data processing situation is provided by the processing of successive telephone call records on a time division basis. In such a case, each time slot associated with a particular call has one of four items of information associated with it and recorded in the data store. The first of these items is a progress mark. If the progress mark indicates that the time slot is inactive, a transfer takes place to a call record of a succeeding time slot. However, if the time slot is active, the call record is processed to determine information about the call, such as the telephone number of the talking parties.

A portion of a representative program for accomplishing the foregoing examination of a call record is given in the table for which each program store location is assumed to contain 20 binary digits or bits:

TABLE

| Program Store Address | Instruction | | |
|---|---|---|---|
| 34 | STA | TS1 | |
| 35 | CGT DR × DAR | | RED C1 |
| 36 | NOT 15 | | RED C2 |
| 37 | FIL 10 | | NOT 5 |
| . | . | | . |
| 47 | RED C3 | | . |
| . | . | | . |
| 325 | STA | TS2 | |

There are two kinds of entries in the table. For the first, at address 34, an entire storage location of 20 bits (excluding parity bits) is occupied by a single instruction for which the first 15 bits indicate the address TS1 in the data store assigned to time slot number 1. The remaining five bits of instruction 34 are devoted to the command portion STA.

For entries of the second kind, at locations 35 through 41, each storage location contains two instructions of 10 bits each. The instructions are further divided into two subgroups of five bits each. One subgroup of five gives a command and the other refers to an address. The mnemonics associated with the various instructions will become apparent from a detailed consideration of the program.

When the output of the program address register corresponds to address 34, the contents of the corresponding program store memory location enter the instruction register. Subsequently the command portion, representatively the code word 10,000, is decoded to produce an enabling signal at the data register gate 64 to allow bits one through 15 to enter the data register.

On the next cycle of operation the increment circuit augments the output of the program address register by unity so that the twin instructions at location 35 enter the instruction register. The left-hand instruction CGT (Clear and Gate) is executed first. It contains two commands, the first five bits of which clear the data address register and the second five bits of which gate the contents of the data register to the data address register. The right-hand instruction RED (Read) from location 35 is responsible for the reading of the C1 call record associated with time slot 1. Because the address in the data address register is that of time slot 1, the data item extracted from the data store will be within the call record of that time slot. Since each call record contains up to four separate items of information, the particular record being examined is determined by setting the two lower order bits of the data address register through a logic network 71. For the first call record, i.e., C1, the two lower order bits are set to zero.

The left-hand instruction NOT (No Output Test) at location 36 commands an examination by the comparator 61 of the C1 call record now in the data register. If the latter consists entirely of zeros, the time slot is inactive and a transfer is undertaken to a succeeding time slot for an examination of its call record. The transfer is effected by the gating of the operand portion, 15, of the instruction NOT into the right-hand section of the program address register. This displaces the earlier contents of that portion of the register so that the program address becomes 47. On the next cycle of operation the instruction RED (Read) at location 47 enters the instruction register to allow an examination of the call record C3 in the data register. The result is a short range transfer.

Returning to the NOT instruction at address 36, if the first item of the call record in time slot 1 indicates that the time slot is active, an examination is made of the second portion of the record which is gated into the data register by the RED instruction at address 36. On the next cycle of machine operation a FIL (Fill) instruction operand is gated into the auxiliary register in preparation for a transfer that extends beyond the range afforded by displacing the five lower order bits of the program address register. On the next half cycle, a NOT instruction commands an examination of the C2 data word. If it is found to be in a zero condition, a transfer is undertaken to location 325. This extended range is made possible by the combined displacement of the program address register contents in the middle and right-hand portions. At the time that the right-hand portion is being displaced, the contents of the auxiliary register also enter the program address register if the auxiliary register output gate had been set earlier.

It is to be noted that the address of the FIL instruction is the binary counterpart of a decimal 10, while the address of the NOT instruction is the binary counterpart of a decimal 5. Since the program store address is below ten bits, these two portions provide the entire transfer address, the decimal counterpart being 325 as indicated.

The instruction STA at location 325 is similar to that at address 34 except that it initiates an examination of the call record of the next succeeding time slot.

Other adaptations and employments of the invention will be apparent to those skilled in the art.

What is claimed is:

1. The method of controlling a data processor comprising the steps of:

1. addressing a memory for instructions, including transfer instructions;
2. extracting the addressed instructions from said memory;
3. forming an address of said memory by displacing a fractional portion of a pre-existing address with a portion of an extracted transfer instruction; and
4. addressing said memory with the address thus formed for the next instruction.

2. The method as defined in claim 1 wherein displacing portions of extracted transfer instructions are accumulated over at least two cycles of operation.

3. The method of controlling the sequence of operations performed by an electronic data processor comprising the steps of:

1. addressing a memory for sets of electrical signals representing instructions, including transfer instructions;
2. storing the electrical signals representing an addressed instruction in an instruction register;
3. storing a portion of the electrical signals constituting a first transfer instruction extracted from said memory in a storage register by enabling selected gates when said electrical signals constituting said first transfer instructon are present in said instruction register;
4. forming an address of said memory by replacing a fractional portion of a pre-existing address thereof, contained in a program address register, with the stored portion of said first transfer instruction and with a portion of electrical signals representing a second transfer instruction extracted from said memory; and
5. addressing said memory with the address thus formed for the next instruction.

4. Apparatus comprising storage means, means for addressing said storage means to extract signals therefrom, means for storing a portion of a first set of signals extracted from said storage means, means for extracting a second set of signals from said storage means, and means for partially displacing the signals in the addressing means with said stored signals and selected ones of the second set of signals to form the address of a nonsequential instruction.

5. Apparatus comprising a memory with a plurality of storage locations for groups of signals representing program instructions, including transfer instructions, means for generating signals sequentially addressing the storage locations of said program instructions, means for extracting the addressed signals, including transfer signals, from said memory, and means for modifying a fractional portion of the address signals with a portion of said transfer signals to form the address of an instruction.

6. Apparatus comprising a program store, a register for addressing said program store, means for incrementing the addresses of said register, a register for storing the addressed contents of said program store, and means for partially replacing the contents of the address register with a portion of the contents of the storage register to form a nonsequential instruction address.

7. In an apparatus having an addressable store, the improvement comprising, control means for directing a transfer to a nonsequential location in said store, which means supplies a fractional portion of a store address, and combining means responsive to said control means for replacing an equivalent portion of a pre-existing store address with said fractional portion.

8. The improvement of claim 7 wherein said control means includes means for successively supplying at least two fractional portions of a store address, and said combining means includes means for replacing an equivalent portion of said pre-existing address with all of said fractional portions.

9. The improvement of calim 8 further comprising, means for accumulating said fractional portions over at least two cycles of operation.

10. In a general purpose digital computer having an address register of given length for providing access to an addressable store, the improvement comprising, means for extracting a transfer instruction from said store, and means responsive to said transfer instruction for replacing a portion of said address register with a portion of said transfer instruction, which portion is of less length than the length of said address register, to obtain a nonsequential address.

11. The method of controlling the sequence of operations performed by an electronic data processor comprising the steps of:

1. addressing a memory for sets of electrical signals representing instructions, including transfer instructions;
2. storing the electrical signals representing each addressed instruction in an instruction register;
3. forming an address of said memory, when electrical signals representing a transfer instruction are present in said instruction register, by replacing a fractional portion of a set of electrical signals contained in the program address register of said processor with a portion of the electrical signals in said instruction register; and
4. addressing said memory with the address thus formed for the next instruction.

12. The method of controlling the sequence of operations performed by an electronic data processor comprising the steps of:

1. storing a selected set of electrical signals in the program address register of said processor;
2. enabling selected memory address gates, responsive to the contents of said program address register, to address a selected processor memory location containing a transfer instruction in the form of electrical signals;
3. storing said transfer instruction signals in the instruction register of said processor, via said enabled address gates;
4. displacing a fractional portion of the contents of said program address register with a first portion of said transfer instruction by enabling gates responsive to a second portion of said transfer instruction;
5. enabling selected memory address gates with the modified contents of said program address register to address a selected memory location containing a new instruction in the form of electrical signals; and
6. replacing said transfer instruction signals in said instruction register with said new instruction signals via said enabled address gates.

13. The method of claim 12 wherein the number of bit positions in said instruction register occupied by the operand of said transfer instruction is less than the number of bits in a full memory address and step (4) further comprises;

modifying the contents of said program address register by gating each of the electrical signals occupying the set of instruction register bit positions containing said operand directly into a selected bit position of said program address register.

* * * * *

UNITED STATES PATENT OFFICE
CERTIFICATE OF CORRECTION

Patent No. 3,774,166 Dated November 20, 1973

Inventor(s) Frank S. Vigliante

It is certified that error appears in the above-identified patent and that said Letters Patent are hereby corrected as shown below:

Assignee: Bell Telephone Laboratories, Incorporated,
New York, N. Y., a corporation of New York.

Column 1, line 36, "procesisng system" should read -- processing system --. Column 6, line 7, "calim 8 further" should read -- claim 8 further --.

Signed and sealed this 16th day of July 1974.

(SEAL)
Attest:

McCOY M. GIBSON, JR.
Attesting Officer

C. MARSHALL DANN
Commissioner of Patents